United States Patent
Kutchey et al.

(10) Patent No.: US 6,364,349 B1
(45) Date of Patent: Apr. 2, 2002

(54) INFLATABLE CURTAIN HOUSING WITH DEPLOYMENT FLAP

(75) Inventors: Michael B. Kutchey, Macomb Township; Russell E. Stein, Leonard; Ali Emam Bakhsh, Rochester Hills, all of MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 09/839,915

(22) Filed: Apr. 20, 2001

(51) Int. Cl.$^7$ .............................................. B60R 21/22
(52) U.S. Cl. .................................. 280/730.2; 280/728.3
(58) Field of Search ........................... 280/728.1, 728.2, 280/730.1, 730.2, 732, 728.3

(56) References Cited

U.S. PATENT DOCUMENTS

| | | | |
|---|---|---|---|
| 4,842,299 A | * | 6/1989 | Okamura et al. ............ 280/732 |
| 5,265,903 A | | 11/1993 | Kuretake et al. |
| 5,324,072 A | | 6/1994 | Olson et al. |
| 5,498,030 A | | 3/1996 | Hill et al. |
| 5,540,459 A | | 7/1996 | Daniel |
| 5,755,457 A | * | 5/1998 | Specht .................... 280/728.2 |
| 5,791,683 A | | 8/1998 | Shibata et al. |
| 5,921,575 A | | 7/1999 | Kretschmer et al. |
| 6,102,435 A | * | 8/2000 | Wallner et al. .......... 280/730.2 |
| 6,158,763 A | * | 12/2000 | Dominique et al. ..... 280/728.1 |
| 6,224,091 B1 | * | 5/2001 | Eyrainer et al. ......... 280/730.2 |
| 6,257,616 B1 | * | 7/2001 | Nowak et al. ........... 280/730.2 |

\* cited by examiner

Primary Examiner—Paul N. Dickson
Assistant Examiner—Faye M. Fleming
(74) Attorney, Agent, or Firm—Tarolli, Sundheim, Covell, Tummino & Szabo L.L.P.

(57) ABSTRACT

Apparatus (10) includes an inflatable vehicle occupant protection device (14) and a housing (26). The protection device (14) is inflatable away from a vehicle roof (18) between a vehicle side structure (16) and a vehicle occupant (182). The housing (26) includes an elongated channel portion (80) having first and second longitudinal edges (94 and 96) defining a chamber (82). A closure flap (100) extends from the first edge (94) and has an end releasably connected to the second edge (96) to enclose the protection device (14) in the chamber (82). A deployment flap (120) overlies the closure flap (100). The deployment flap (120) is adapted to move into a position overlying a side trim piece (150) and direct the protection device to inflate between the occupant (182) and the trim piece when the protection device is inflated.

20 Claims, 4 Drawing Sheets

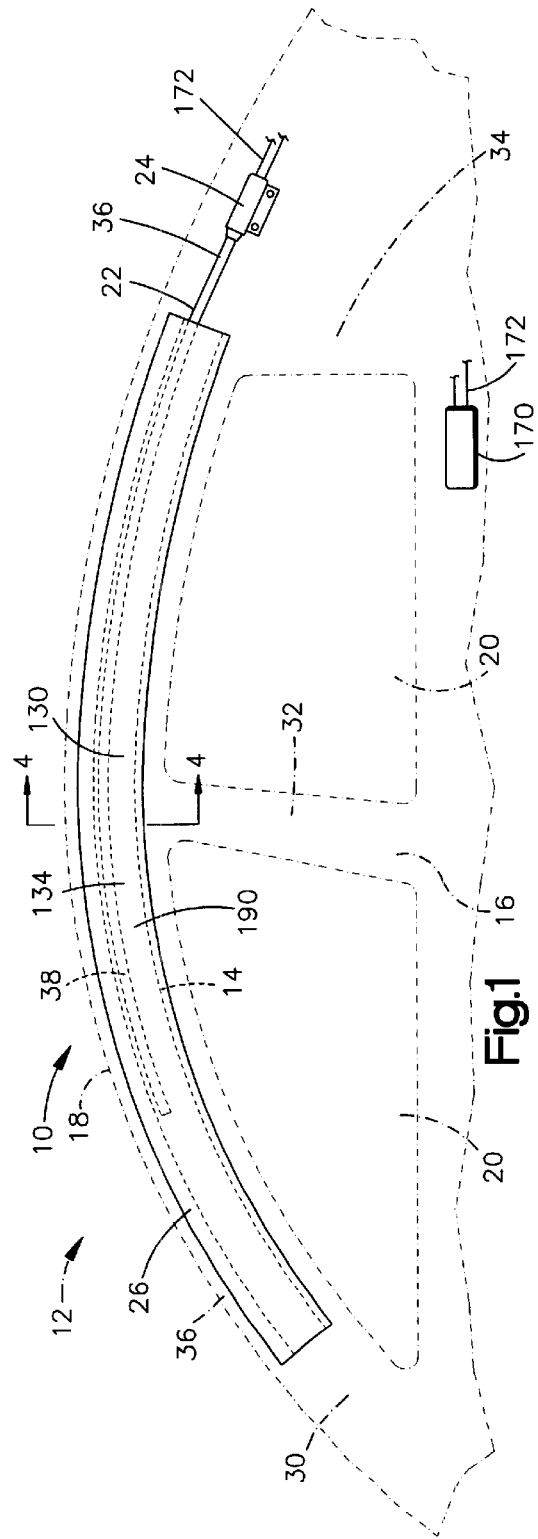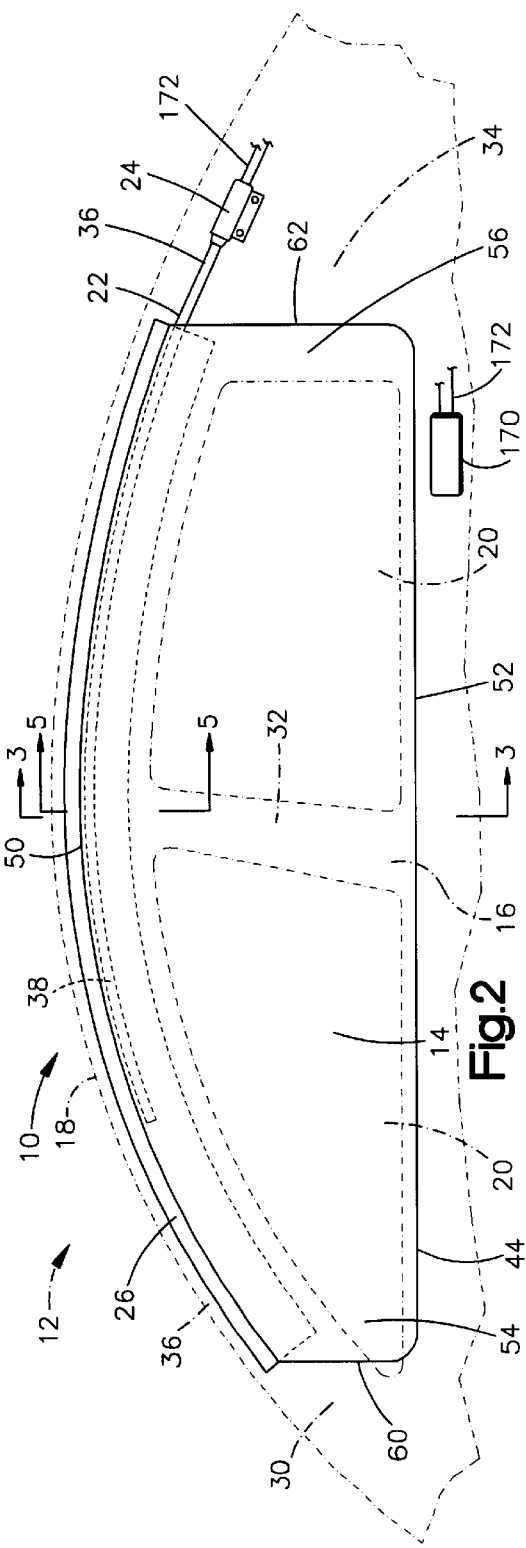

INFLATABLE CURTAIN HOUSING WITH DEPLOYMENT FLAP

FIELD OF THE INVENTION

The present invention relates to an inflatable apparatus for helping to protect a vehicle occupant in the event of a side impact to the vehicle and/or a vehicle rollover.

BACKGROUND OF THE INVENTION

It is known to inflate an inflatable vehicle occupant protection device to help protect a vehicle occupant in the even t of a vehicle collision. One particular type of inflatable vehicle occupant protection device is an inflatable curtain that inflates away from the roof of the vehicle downward inside the passenger compartment between a vehicle occupant and the side structure of the vehicle in the event of a side impact or rollover. Such known inflatable curtains are typically stored in a housing that opens upon inflation of the inflatable curtain. A known inflatable curtain is inflated from a deflated condition by inflation fluid directed from an inflator to the inflatable curtain.

SUMMARY OF THE INVENTION

The present invention relates to an apparatus for helping to protect an occupant of a vehicle that has a side structure and a roof. The apparatus comprises an inflatable vehicle occupant protection device and a housing for storing the protection device in a stored position. The protection device is inflatable away from the vehicle roof into a position between the side structure of the vehicle and a vehicle occupant.

The housing comprises an elongated channel portion that helps define a chamber for receiving the protection device. The channel portion has spaced first and second longitudinal edges extending along the length of the channel portion. A closure flap extends from the first longitudinal edge and has an end releasably connected to the second longitudinal edge to at least partially enclose the protection device in the chamber when the protection device is in the stored position.

The housing also comprises a deployment flap that extends from the channel portion adjacent the second longitudinal edge of the channel portion. The deployment flap overlies the closure flap when the closure flap is connected to the second longitudinal edge. The deployment flap is adapted to move into a position overlying a vehicle side trim piece when the protection device is inflated. The deployment flap directs the protection device to inflate inwardly of the vehicle side trim piece between the occupant and the trim piece.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 1 is a schematic view of an apparatus for helping to protect a vehicle occupant illustrating the apparatus in a deflated condition, according to the invention;

FIG. 2 is a schematic view of the apparatus of FIG. 1 in an inflated condition;

DESCRIPTION OF PREFERRED EMBODIMENTS

Figure 3:
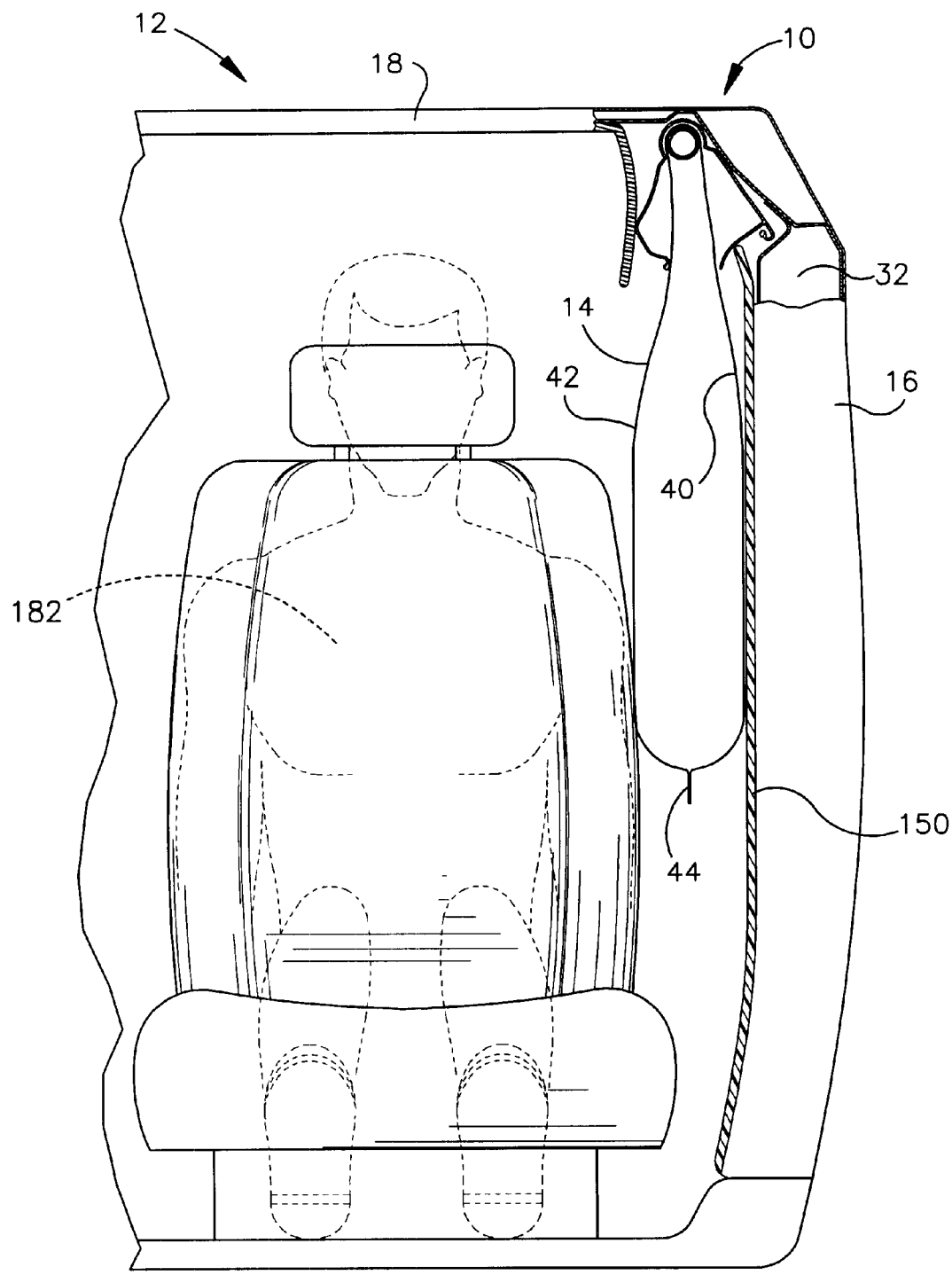
FIG. 3 is a sectional view of the apparatus taken generally along line 3—3 in FIG. 2.

As representative of the present invention, an apparatus 10 helps to protect an occupant of a vehicle 12. As shown in FIGS. 1 and 2, the apparatus 10 includes an inflatable vehicle occupant protection device in the form of an inflatable curtain 14 that is mounted adjacent the side structure 16 of the vehicle 12 and the roof 18 of the vehicle. The side structure 16 of the vehicle 12 includes side windows 20, an A pillar 30, a B pillar 32, and a C pillar 34. An inflator 24 is connected in fluid communication with the inflatable curtain 14 through a fill tube 22. The fill tube 22 may be constructed of any suitable material, such as metal, plastic, or fabric. Also, those skilled in the art will recognize that the fill tube 22 may be omitted, in which case the inflator 24 may be connected directly to the inflatable curtain 14.

The fill tube 22 has a first end portion 36 for receiving fluid from the inflator 24. The fill tube 22 may be connected directly to the inflator 24 or a manifold (not shown) may connect the fill tube to the inflator. The fill tube 22 has a second end portion 38 disposed in the inflatable curtain 14.

The inflator 24 contains a stored quantity of pressurized inflation fluid (not shown) in the form of a gas to inflate the inflatable curtain 14. The inflator 24 alternatively could contain a combination of pressurized inflation fluid and ignitable material for heating the inflation fluid, or could be a pyrotechnic inflator that uses the combustion of gas-generating material to generate inflation fluid. As a further alternative, the inflator 24 could be of any suitable type or construction for supplying a medium for inflating the inflatable curtain 14.

The apparatus 10 includes a housing 26 that stores the inflatable curtain 14 in a deflated condition. The fill tube 22, the deflated inflatable curtain 14, and the housing 26 have an elongated configuration and extend along the vehicle roof 18 and along the side structure 16 of the vehicle 12 above the side windows 20. The fill tube 22, inflatable curtain 14 and housing 26 are connected to the vehicle 12 by known means (not shown), such as brackets.

As best illustrated in FIG. 3, the inflatable curtain 14 comprises first and second panels 40 and 42 that are arranged in an overlying manner. Preferably, overlapping portions of the first and second panels 40 and 42 are secured together by weaving or stitching the panels together along at least a portion of a perimeter 44 (FIGS. 2 and 3) of the inflatable curtain 14 to form an inflatable volume of the curtain.

The perimeter 44 is defined at least partially by an upper edge 50 (FIG. 2) of the inflatable curtain 14, an opposite lower edge 52 of the curtain, and front and rear portions 54 and 56, respectively, of the curtain spaced apart horizontally along the upper and lower edges. In the embodiment illustrated in FIG. 2, the front and rear portions 54 and 56 of the inflatable curtain 14 are partially defined by front and rear edges 60 and 62, respectively, that are spaced horizontally apart along the upper and lower edges 50 and 52 and extend vertically between the upper and lower edges. The front and rear edges 60 and 62, however, could be omitted and the upper and lower edges 50 and 52 could be extended until they intersect, in which case the front and rear portions 54 and 56 would be defined by the intersecting upper and lower edges. Also, while the front and rear edges 60 and 62 are illustrated as being generally vertical, they could extend at some other angle between the upper and lower edges 50 and 52.

As illustrated in FIG. 3, the inflatable curtain 14 is formed from a sheet of material that is folded over to form the overlying first and second panels 40 and 42. It will be recognized by those skilled in the art, however, that the inflatable curtain 14 could have alternative constructions. For example, the first and second panels 40 and 42 could be formed from separate sheets of material arranged in an overlying manner and secured together by stitching, ultrasonic bonding, heat welding, or adhesive bonding that extends around the entire perimeter 44 of the panels to form the inflatable curtain 14. As a further alternative, the inflatable curtain 14 could be woven as a single piece of material.

The first and second panels 40 and 42 are preferably constructed of a fabric, such as nylon, that may be coated with a gas impermeable material, such as urethane or silicone. The inflatable curtain 14 thus may have a substantially gas-tight construction. Other materials, such as elastomers, plastic films, or combinations thereof, may also be used to construct the inflatable curtain 14. The first and second panels 40 and 42 may also be formed of single or multi-layered sheets of material.

Figure 4:
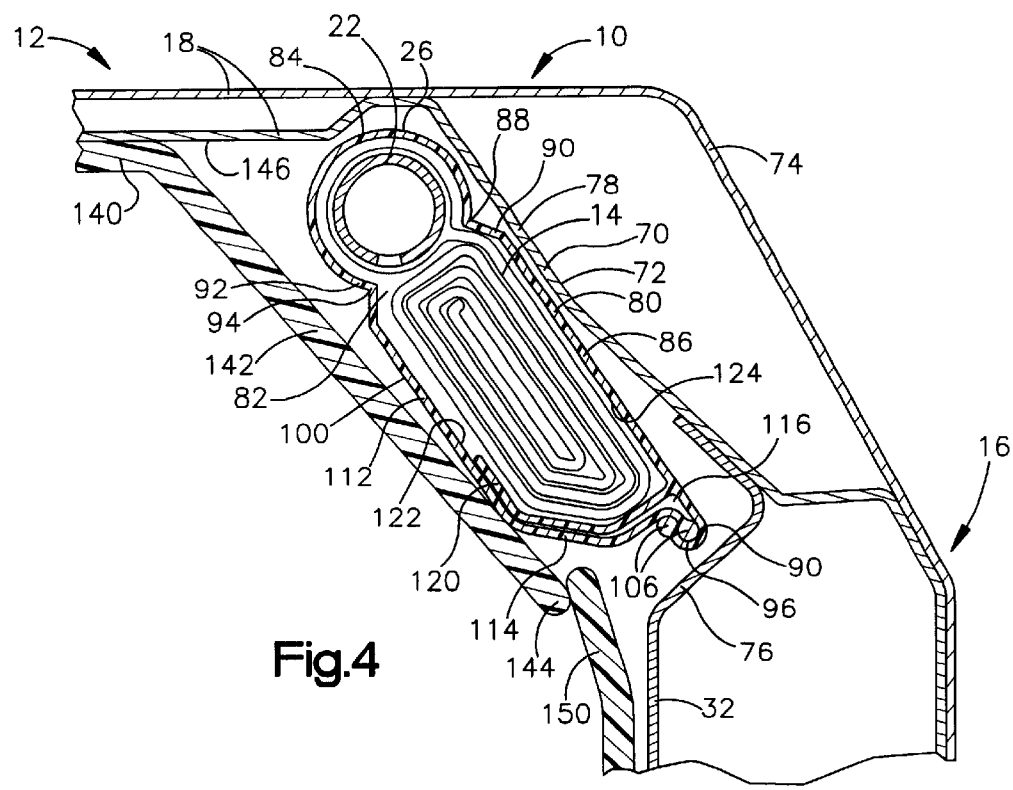
FIG. 4 is a sectional view of the apparatus taken generally along line 4—4 in FIG. 1.

As illustrated in FIG. 4, a vehicle roof rail 70 is located at the intersection of the side structure 16 of the vehicle and the vehicle roof 18. The side structure 16, roof 18 and roof rail 70 are formed from pieces of sheet metal that are stamped or otherwise formed into predetermined shapes and welded or otherwise connected to form a desired structure. In the embodiment illustrated in FIG. 4, inner and outer pieces of sheet metal 72 and 74, respectively, are used to form the side structure 16, roof 18 and roof rail 70. A third piece of sheet metal 76 helps to form the B pillar 32 of the vehicle 12. Those skilled in the art will recognize, however, that the side structure 16, roof 18, roof rail 70, and B pillar 32 may have alternative constructions.

The housing 26 is preferably constructed of a single piece of homogeneous material that is extruded or injection molded from a plastic material. The housing 26 includes an elongated channel portion 80 that defines a chamber 82 for receiving the fill tube 22 and the inflatable curtain 14. The channel portion 80 comprises an arc-shaped end portion 84 and an outer wall portion 86 connected to a first end 88 of the arc-shaped end portion by an angled portion 90 of the housing 26. As illustrated in FIG. 4, the end portion 84 may extend more than 180 degrees around the fill tube 22 to help secure the fill tube in the housing 26. A second end 92 of the arc-shaped end portion 82, opposite the first end 88, defines a first longitudinal edge 94 of the channel portion 80. A second longitudinal edge 96 of the channel portion 80 is defined along the end of the outer wall portion 86 opposite the end portion 84.

A closure flap 100 extends from the first longitunal edge 94 and is interconnected with the outer wall portion 86 along the second longitudinal edge 96 by means, such as interlocking beads 106. The closure flap 100, when connected to the outer wall portion 86, at least partially closes the channel portion 80 and at least partially encloses the fill tube 22 and the inflatable curtain 14 in the chamber 82 in a folded and stored condition.

The end portion 84, outer wall portion 86, closure flap 100, and the beads 106 may extend substantially along the entire length of the housing 26. This may be the case, for example, if the housing 26 is constructed from extruded plastic. Those skilled in the art, however, will recognize that certain of these elements may not extend along the entire length of the housing 26. For example, the beads 106 may be located intermittently along the length of the housing 26. This may be the case, for example, if the housing 26 is constructed from injection molded plastic. Also, by way of further example, portions of the end portion 84, outer wall portion 86, and closure flap 100 may be removed along the length of the housing 26 so that means, such as brackets, can extend through the housing to connect the housing, inflatable curtain 14, and fill tube 22 to the vehicle 12.

The end portion 84 of the housing 26 is positioned adjacent the roof rail 70 near the intersection of the side structure 16 and the vehicle roof 18. The outer wall portion 86 has a generally flat configuration and extends from the end portion 84 away from the roof 18 along an inner portion 78 of the roof rail 70. The bead 106 of the outer wall portion 86 is located at the terminal end of the second longitudinal edge 96 of the channel portion 80.

The closure flap 100 extends from the first longitudinal edge 94 away from the vehicle roof 18. The closure flap 100 includes a first portion 112 that is spaced from and extends generally parallel to the outer wall portion 86. The closure flap 100 also includes a second portion 114 that curves or is otherwise bent towards the second longitudinal edge 96. The bead 106 of the closure flap 100 is located at the terminal end of the second portion 114 of the closure flap. When the closure flap 100 is interconnected with the outer wall portion 86 via the beads 106, the bead of the closure flap is located in a concave slot 116 formed along the second longitudinal edge 96 adjacent the bead 106 of the outer wall portion 86.

The housing 26 also includes a deployment flap 120 that extends from an inner surface 124 of the outer wall portion 86, adjacent the second longitudinal edge 96, into the chamber 82 of the. channel portion 80. When the apparatus 10 is in the stored position of FIG. 4, the deployment flap 120 overlies the second portion 114 and a portion of the first portion 112 of the closure flap 100. The deployment flap 120 thus may overlie a major portion of the closure flap 100. The deployment flap 120 has a curved or bent configuration and extends along an inner surface 122 of the closure flap 100. As shown in FIG. 4, the curved or bent configuration of the deployment flap 120 may follow the contour of the first and second portions 112 and 114 of the closure flap 100.

The vehicle 12 includes a headliner 140 that extends along an inner surface 146 of the roof 18 of the vehicle. The headliner 140 has a portion 142 that extends at an acute angle relative to the roof 18 adjacent the housing 26. The portion 142 of the headliner 140 is positioned adjacent the closure flap 100. A terminal end 144 of the headliner is in abutting engagement with a trim piece 150 of the vehicle 12.

Those skilled in the art will recognize that the configuration of the vehicle structure and, thus, the spatial and interconnecting relationships between the vehicle structure and the headliner 140, trim piece 150 and housing 26 may vary depending upon the particular vehicle. Therefore, it should be recognized that the vehicle structure illustrated in FIGS. 4 and 5 and the spatial and interconnecting relationships between the vehicle structure and the headliner 140, trim piece 150 and housing 26 is for illustrative purposes and may vary without departing from the spirit of the present invention.

In the embodiment illustrated in FIG. 4, the trim piece 150 overlies the B pillar 32 of the vehicle 12 and is positioned generally adjacent and below the housing 26. Similar trim pieces (not shown) would also overlie the C pillar 34 (FIGS. 1 and 2) and a D pillar (not shown) of the vehicle 12. The configuration of the vehicle structure and the spatial and interconnecting relationships between the vehicle structure and the headliner 140, trim piece 150 and housing 26 at these locations would be similar to that illustrated in FIGS. 4 and 5. Therefore, FIGS. 4 and 5 illustrate the present invention as the present invention relates to the B pillar 32, C pillar 34, and the D pillar of the vehicle 12.

The vehicle 12 includes a sensor mechanism 170 (shown schematically in FIGS. 1 and 2) for sensing a side impact to the vehicle 12 and/or a rollover of the vehicle 12. The sensor mechanism 170 actuates the inflator 24 in response to the sensing of a side impact or a vehicle rollover. In the event of a rollover of the vehicle or a side impact to the vehicle 12 for which inflation of the curtain 14 is desirable, the sensor mechanism 170 provides an electrical signal over lead wires 172 to the inflator 24. The electrical signal causes the inflator 24 to be actuated in a known manner. The inflator 24 discharges fluid under pressure through fill tube 22, which directs the fluid into the inflatable curtain 14.

The inflatable curtain 14 inflates under the pressure of the inflation fluid from the inflator 24. The beads 106 on the outer wall portion 86 and the closure flap 100 separate under the pressure of the inflation fluid, and the housing 26 opens to the position illustrated in FIG. 5. The inflatable curtain 14 inflates away from the roof 18 in a downward direction as shown in the drawings and in a downward direction with respect to the direction of forward travel of the vehicle 12 into the position illustrated in FIGS. 2, 3 and 5.

Figure 5:
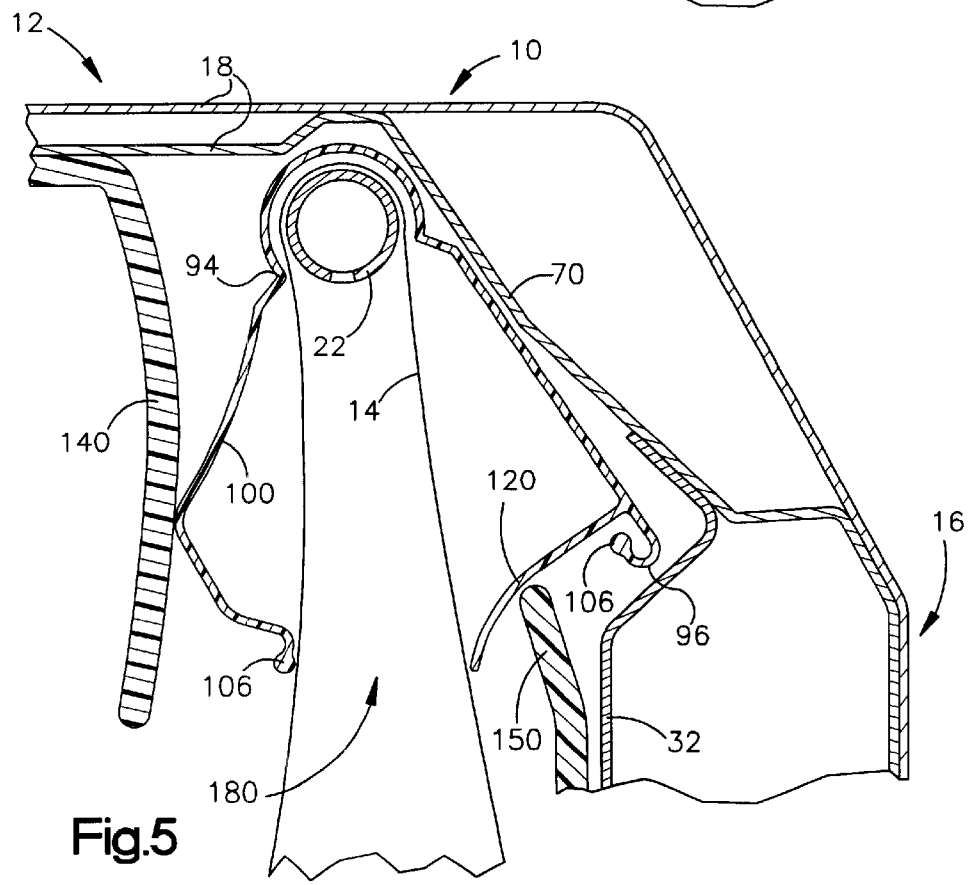
FIG. 5 is a sectional view of the apparatus taken generally along line 5—5 in FIG. 2.

When the housing 26 opens, the inflating curtain 14 causes the closure flap 100 (FIG. 5) to pivot or otherwise move in a direction generally away from the vehicle side structure 16 and roof rail 70 into the position illustrated in FIG. 5. As the closure flap 100 moves from the position of FIG. 4 to the position of FIG. 5, the closure flap engages the headliner 140 and causes the headliner to move in a direction generally away from the side structure 16 and roof rail 70 into the position illustrated in FIG. 5. This creates an opening 180 between the outer wall portion 86 and the closure flap 100 through which the inflatable curtain 14 may extend during inflation and while in the inflated condition.

As a feature of the present invention, the deployment flap 120 helps to deflect or otherwise direct the inflatable curtain 14 to inflate inboard of the trim piece 150, between the trim piece and any occupants of the vehicle. During inflation of the inflatable curtain 14, the deployment flap 120 is deflected or bent from the position illustrated in FIG. 4 to the position illustrated in FIG. 5. The deployment flap 120, when in the position illustrated in FIG. 5, extends inboard of the trim piece 150. Thus, as the inflatable curtain 14 inflates, the deployment flap 120 helps prevent the curtain from getting caught on the trim piece 150 or inflating between the trim piece and the side structure 16.

The closure flap 100 and the deployment flap 120 may extend substantially along the entire length of the housing 26. This may be the case, for example, if the housing 26 is constructed from extruded plastic. The deployment flap 120, however, may only be required adjacent the pillars of the vehicle 12. Thus, individual deployment flaps 120 may be spaced apart along the length of the housing 26 at positions adjacent the B, C and/or D pillars of the vehicle 12. This may be the case, for example, if the housing 26 is constructed from injection molded plastic, and the deployment flaps 120 are molded individually. As an alternative, in an extruded construction, portions of the deployment flap 120 positioned between the vehicle pillars could be cut away or otherwise removed so that deployment flaps are positioned only at locations adjacent the vehicle pillars.

The inflatable curtain 14 (FIG. 3), when inflated, extends along the side structure 16 of the vehicle 12 and is positioned between the side structure and any occupant 182 of the vehicle. As illustrated in FIG. 3, the inflatable curtain 14, when inflated, is also positioned between the trim piece 150 and the occupant 182 of the vehicle 12. When the inflatable curtain 14 is in the inflated condition, the first panel 40 is positioned adjacent the side structure 16 of the vehicle 12. The second panel 42 is positioned adjacent or near the vehicle occupant 182. The upper edge 50 (FIG. 2) is positioned adjacent to the intersection of the roof 18 and the side structure 16 of the vehicle 12. The front portion 54 is positioned adjacent to the A pillar 30 of the vehicle 12. The rear portion 56 of the inflatable curtain 14 is positioned adjacent to the C pillar 34 of the vehicle 12. The inflatable curtain 14 extends between the A pillar 30 and the C pillar 34 of the vehicle 12 and overlies at least a portion of the A pillar, C pillar, and the B pillar 32 of the vehicle.

It will be recognized by those skilled in the art that the inflatable curtain 14 may have alternative configurations. For example, in the illustrated embodiment, the inflatable curtain 14 extends between the A pillar 30 and the C pillar 34 of the vehicle 12. The inflatable curtain 14 could, however, extend between the A pillar 30 and the B pillar 32 only or between the B pillar and the C pillar 34 only. Also, in a vehicle having A, B, C, and D pillars (not shown), the inflatable curtain 14 could, when inflated, extend between the A pillar and the D pillar.

The inflatable curtain 14, when inflated, helps to protect a vehicle occupant in the event of a vehicle rollover or a side impact to the vehicle 12. The housing 26 and, particularly, the deployment flap 120 help to position the inflatable curtain 14, when inflated, between a vehicle occupant and vehicle trim pieces 150, which overlie the side structure. The inflatable curtain 14, when inflated, helps to absorb the energy of impacts with the curtain and helps to distribute the impact energy over a large area of the curtain.

Figure 6:
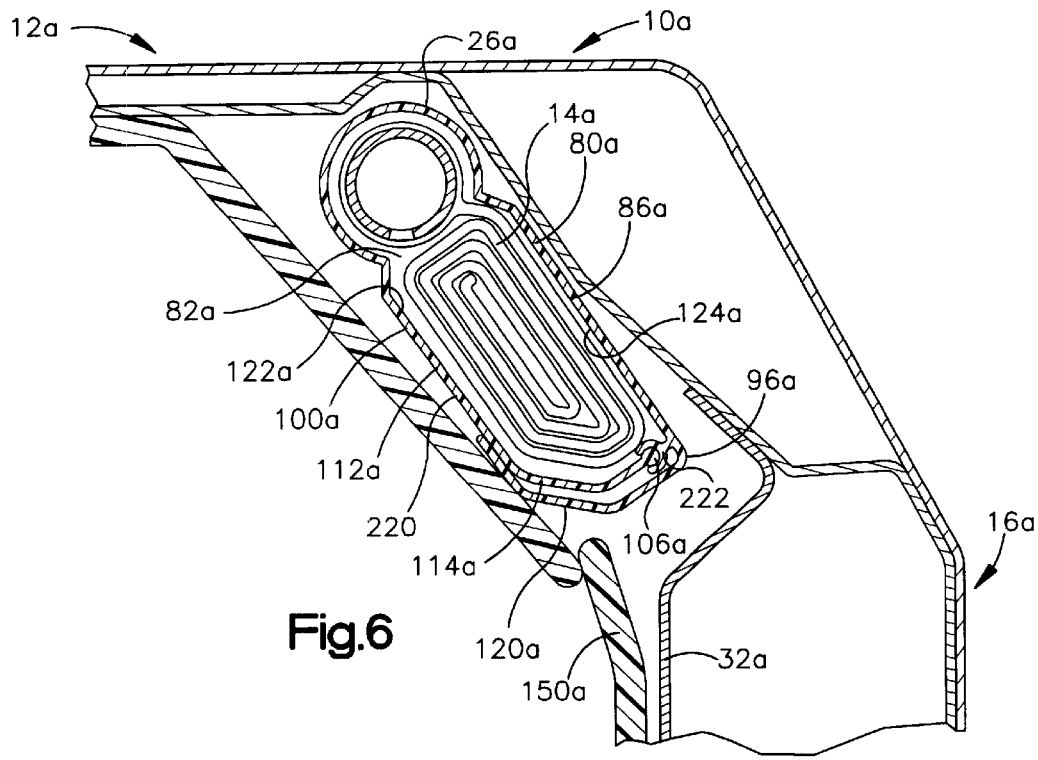
FIG. 6 is a sectional view of an apparatus for helping to protect a vehicle occupant illustrating the apparatus in a deflated condition, according to a second embodiment of the present invention.
Figure 7:
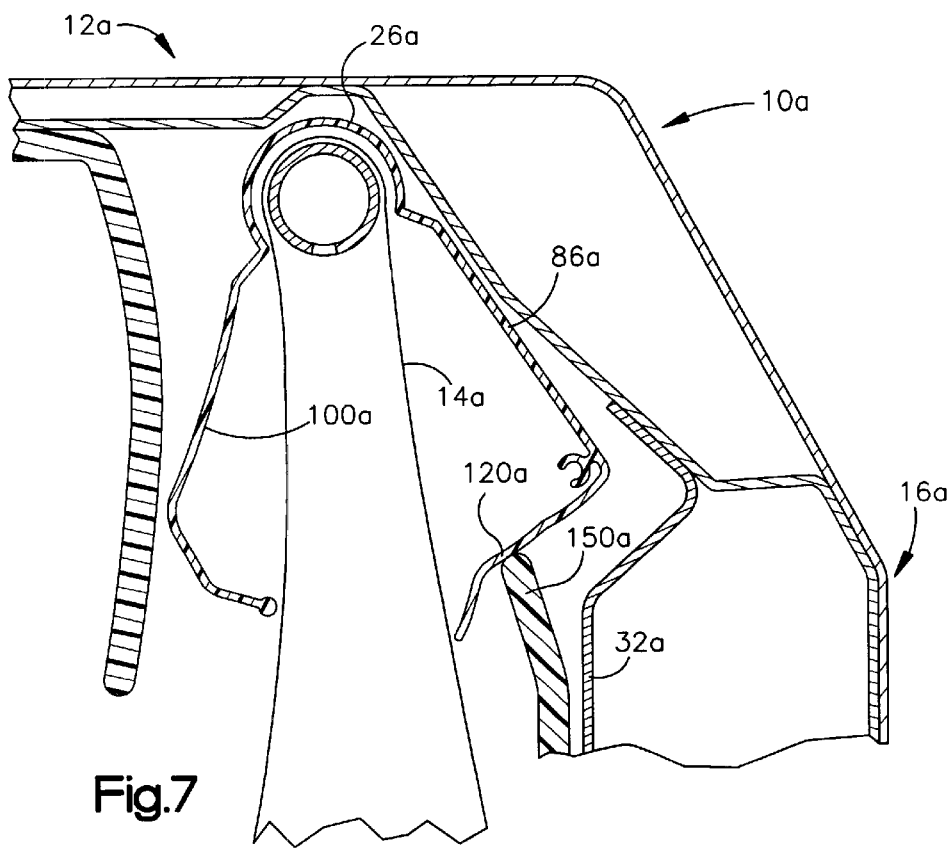
FIG. 7 is a sectional view of the apparatus of FIG. 6 in an inflated condition.

A second embodiment of the present invention is illustrated in FIGS. 6 and 7. The second embodiment of the invention is similar to the first embodiment of the invention illustrated in FIGS. 1–5. Accordingly, numerals similar to those of FIGS. 1–5 will be utilized in FIGS. 6 and 7 to identify similar components, the suffix letter "a" being associated with the numerals of FIGS. 6 and 7 to avoid confusion. The apparatus 10a of the second embodiment of the present invention is identical to the apparatus 10 of the first embodiment (FIGS. 1–5), except that the housing 26a of the second embodiment (FIGS. 6 and 7) has a different configuration than the housing 26 of the first embodiment (FIGS. 1–5).

As illustrated in FIG. 6, the deployment flap 120a extends from the outer wall portion 86a at the second longitudinal edge 96a of the channel portion 80a. The deployment flap 120a extends along the closure flap 100a adjacent to an outer surface 220, opposite the inner surface 122a, of the closure flap. The deployment flap 120a is thus positioned outside the chamber 82a. The deployment flap 120a has a curved or bent configuration and overlies the second portion 114a and a portion of the first portion 112a of the closure flap 100a.

The bead 106a on the closure member 100a interlocks with a clasp 222 that extends from the inner surface 124a of the outer wall portion 86a near the second longitudinal edge 96a. The clasp 222 may be one of several individual clasps spaced along the length of the housing 26a with each clasp extending along a predetermined portion of the length of the housing. This may be the case, for example, if the housing 26 is constructed from injection molded plastic. Alternatively, the clasp 222 may extend along the entire length of the housing 26a. This may be the case, for example, if the housing 26a is constructed from extruded plastic.

When the inflatable curtain 14a is inflated, the deployment flap 120a operates to help prevent the curtain from getting caught on the trim piece 150a or inflating between the trim piece and the vehicle side structure 16a. The deployment flap 120a helps to deflect or direct the inflatable curtain 14a to inflate between the trim piece 150a and an occupant of the vehicle. During inflation of the inflatable curtain 14a, the deployment flap 120a is deflected or bent from the position illustrated in FIG. 6 to the position illustrated in FIG. 7. The deployment flap 120a, when in the position illustrated in FIG. 7, extends inboard of the trim piece 150a, which helps prevent the inflatable curtain 14a from getting caught on the trim piece 150a or inflating between the trim piece and the side structure 16a.

The inflatable curtain 14a, when inflated, helps to protect a vehicle occupant in the event of a vehicle rollover or a side impact to the vehicle 12a. The housing 26a, particularly the deployment flap 120a, helps to position the inflatable curtain, when inflated, between a vehicle occupant and vehicle trim pieces 150a which overlie the side structure. The inflatable curtain 14a, when inflated, helps to absorb the energy of impacts with the curtain and helps to distribute the impact energy over a large area of the curtain.

From the above description of the invention, those skilled in the art will perceive improvements, changes and modifications. Such improvements, changes and modifications within the skill of the art are intended to be covered by the appended claims.

Having described the invention, the following is claimed:

1. Apparatus for helping to protect an occupant of a vehicle that has a side structure and a roof, said apparatus comprising:
    an inflatable vehicle occupant protection device that is adapted to inflate away from the vehicle roof into a position between the side structure of the vehicle and a vehicle occupant; and
    a housing for storing said inflatable vehicle occupant protection device in a stored position, said housing comprising:
    an elongated channel portion that helps define a chamber for receiving said inflatable vehicle occupant protection device, said channel portion having spaced first and second longitudinal edges extending along the length of said channel portion;
    a closure flap extending from said first longitudinal edge of said channel portion, said closure flap having an end releasably connected to said second longitudinal edge of said channel portion to at least partially enclose said inflatable vehicle occupant protection device in said chamber when said inflatable vehicle occupant protection device is in said stored position; and
    a deployment flap extending from said channel portion adjacent said second longitudinal edge of said channel portion, said deployment flap overlying said closure flap when said closure flap is connected to said second longitudinal edge of said channel portion, said deployment flap being adapted to move into a position overlying a vehicle side trim piece when said inflatable vehicle occupant protection device is inflated, said deployment flap directing said inflatable vehicle occupant protection device to inflate inwardly of the vehicle side trim piece between the occupant and the trim piece.

2. Apparatus as defined in claim 1, wherein said inflatable vehicle occupant protection device and said housing have generally elongated configurations extending along the side structure of the vehicle near the intersection of the side structure and the vehicle roof when said inflatable vehicle occupant protection device is in said stored position.

3. Apparatus as defined in claim 1, wherein said first and second longitudinal edges of said housing extend generally parallel to each other.

4. Apparatus as defined in claim 1, wherein said first and second longitudinal edges of said housing extend substantially along the entire length of said housing.

5. Apparatus as defined in claim 1, wherein said deployment flap deflects said inflatable vehicle occupant protection device in said direction away from the vehicle side structure.

6. Apparatus as defined in claim 1, wherein said deployment flap overlies a major portion of said closure flap.

7. Apparatus as defined in claim 1, wherein said channel portion, said closure flap, and said deployment flap are constructed of a single piece of homogeneous material.

8. Apparatus as defined in claim 7, wherein said single piece of homogeneous material is a plastic material.

9. Apparatus as defined in claim 1, wherein said deployment flap overlies said closure flap on an outer surface of said closure flap.

10. Apparatus as defined in claim 1, wherein said deployment flap overlies said closure flap on an inner surface of said closure flap.

11. Apparatus as defined in claim 1, wherein said trim piece overlies a pillar of the vehicle.

12. Apparatus as defined in claim 11, wherein said pillar is at least one of a B pillar and a C pillar of the vehicle.

13. Apparatus as defined in claim 11, wherein said inflatable vehicle occupant protection device, when inflated, overlies at least a portion of said trim piece.

14. Apparatus as defined in claim 1, further comprising an inflation fluid source that provides inflation fluid for inflating said inflatable vehicle occupant protection device, and a fill tube for directing said inflation fluid into said inflatable vehicle occupant protection device to inflate said inflatable vehicle occupant protection device.

15. Apparatus as defined in claim 14, wherein said inflatable vehicle occupant protection device is an inflatable curtain, at least a portion of said inflatable curtain and at least a portion of said fill tube being enclosed in said chamber when said inflatable curtain is in said stored position.

16. Apparatus as defined in claim 15, wherein said inflatable curtain and said fill tube extend along the side structure adjacent to the vehicle roof when said inflatable curtain is in said stored position.

17. Apparatus as defined in claim 15, further comprising a sensor for sensing a vehicle condition for which deployment of said inflatable curtain is desired, said sensor actuating said inflation fluid source to provide inflation fluid to inflate said inflatable curtain.

18. Apparatus as defined in claim 15, wherein said inflation fluid source comprises an inflator that is actuatable to inflate said inflatable curtain.

19. A housing for storing an inflatable curtain for helping to protect an occupant of a vehicle having a side structure and a roof, said housing comprising:

an elongated channel portion that helps to define a chamber for receiving the inflatable curtain, said channel portion having first and second longitudinal edges, said channel portion being adapted to be connected to the vehicle and extend along the intersection of the side structure and the roof;

a closure flap extending from said first longitudinal edge, said closure flap having an end adapted to be interconnected with said channel portion adjacent said second longitudinal edge to at least partially enclose said inflatable curtain in said chamber; and a deployment flap extending from said second longitudinal edge, said deployment flap overlying said closure flap on an outer surface of said closure flap when said end of said closure flap is interconnected with said channel portion, said deployment flap being adapted to move, upon inflation of said inflatable curtain, to a position overlying a trim piece of the vehicle to direct said inflatable curtain to inflate inboard of said trim piece.

20. A housing for storing an inflatable curtain for helping to protect an occupant of a vehicle having a side structure and a roof, said housing comprising:

an elongated channel portion that helps to define a chamber for receiving the inflatable curtain, said channel portion having first and second longitudinal edges, said channel portion being adapted to be connected to the vehicle and extend along the intersection of the side structure and the roof;

a closure flap extending from said first longitudinal edge, said closure flap having an end adapted to be interconnected with said second longitudinal edge of said channel portion to at least partially enclose said inflatable curtain in said chamber; and a deployment flap extending from said channel portion adjacent said second longitudinal edge, said deployment flap being positioned in said chamber and overlying said closure flap on an inner surface of said closure flap when said end of said closure flap is interconnected with said second longitudinal edge, said deployment flap being adapted to move, upon inflation of said inflatable curtain, to a position overlying a trim piece of the vehicle to direct said inflatable curtain to inflate inboard of said trim piece.

* * * * *